United States Patent [19]

Kawasaki et al.

[11] Patent Number: 4,869,367
[45] Date of Patent: Sep. 26, 1989

[54] WELDING WIRE CONTAINER

[75] Inventors: Eiichiro Kawasaki, Suita; Masao Kitagawa, Takatsuki; Hidemi Okabe, Yokohama; Masaru Tabata, Yokohama; Minoru Yamada, Kamakura, all of Japan

[73] Assignee: Kabushiki Kaisha Kobe Seiko Sho, Kobe, Japan

[21] Appl. No.: 735,718

[22] Filed: May 20, 1985

Related U.S. Application Data

[63] Continuation of Ser. No. 589,053, Mar. 15, 1984, abandoned, which is a continuation of Ser. No. 334,814, Dec. 28, 1981, abandoned.

[30] Foreign Application Priority Data

Apr. 22, 1980 [JP] Japan ................................ 55-53976
Dec. 29, 1980 [JP] Japan ......................... 55-190693[U]
Apr. 4, 1981 [JP] Japan ................................ 56-50997
Apr. 13, 1981 [JP] Japan ........................... 59-53550[U]
Jun. 4, 1981 [JP] Japan ........................... 56-82916[U]

[51] Int. Cl.$^4$ ........................................... B65D 85/04
[52] U.S. Cl. .................................. 206/409; 242/171; 242/172
[58] Field of Search ................................ 206/53–55, 206/408, 389, 391, 398, 409, 524.1, 524.2, 524.3, 524.4, 524.6; 242/170–173, 128, 129, 137, 137.1, 138, 146; 220/93, 454, 457; 229/3.5 MF, 3.5 R; 174/137 B

[56] References Cited

U.S. PATENT DOCUMENTS

Re. 9,605 3/1881 Palmer ................................. 242/129
943,202 12/1909 Struss .................................. 206/389
1,952,056 3/1934 Cook ................................... 242/128
2,243,279 5/1941 Kinney .................................. 220/93
2,321,889 6/1943 Bailey .................................. 220/454
2,552,594 5/1951 Scott .
2,579,131 12/1951 Tinsley ............................... 206/409
2,596,970 5/1952 Adams ................................ 242/170
2,610,812 9/1952 Epstein ............................ 242/137.1
2,630,280 3/1953 Wedler ................................ 242/128
2,739,766 3/1956 Rayburn ............................. 242/129
2,950,876 8/1960 McLoughlin ........................ 242/128
3,053,410 9/1962 Eaddy ................................. 220/93
3,127,012 3/1964 Smoot .
3,147,694 9/1964 Northup ................................. 220/93
3,152,694 10/1964 Nashed et al. .................... 229/3.5 R
3,216,559 11/1965 Forbes et al. ...................... 206/524.2
3,272,455 9/1966 Sternberg et al. ................... 242/171
3,297,225 1/1967 Bransten ........................... 229/3.5 MF
3,491,967 1/1970 Sawyer .............................. 242/129
3,604,873 9/1971 Boliver ............................... 220/457
3,700,185 10/1972 Hubbard et al. .................... 242/172
4,300,734 11/1981 Green et al. ....................... 242/170
4,322,483 3/1982 Tune ................................... 429/94

FOREIGN PATENT DOCUMENTS 2610721 9/1977 Fed. Rep. of Germany ... 174/137 B
0002197 2/1961 Japan .
0014571 6/1968 Japan .
0041653 4/1973 Japan .
0066970 5/1973 Japan .
0098420 7/1974 Japan .
00143986 10/1980 Japan .
0106655 12/1980 Japan .
0056783 5/1981 Japan .
0023552 2/1982 Japan .
00106576 7/1982 Japan .
734718 8/1955 United Kingdom ................ 242/129
1220788 1/1971 United Kingdom ........... 174/137 B Primary Examiner—Jimmy G. Foster
Attorney, Agent, or Firm—Oblon, Spivak, McClelland, Maier & Neustadt

[57] ABSTRACT

A welding wire packaging container of mono-cylinder pail type accommodating a welding wire winding which includes of a multitude of layers of looped wire portions having diameters smaller than the inside diameter of the container and centrally having a cavity of substantially cylindrical form. The container includes a retaining member placed on overlying layers of wire loops and adapted to be lowered by gravity as the wire is withdrawn from the container, the retaining member being centrally formed with a circular wire guide hole to permit wire withdrawal therethrough, and resilient members mounted at least two spaced positions around the outer periphery of the retaining member for contact with the inner wall surface of the container, the guide hole in the retaining member being located in vertically spaced relation with an upper lid of the container.

10 Claims, 4 Drawing Sheets

FIGURE 1 *PRIOR ART*
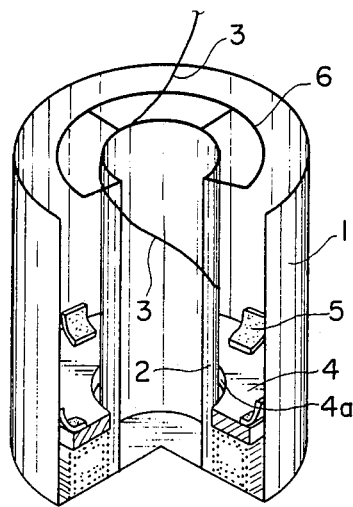
FIGURE 2
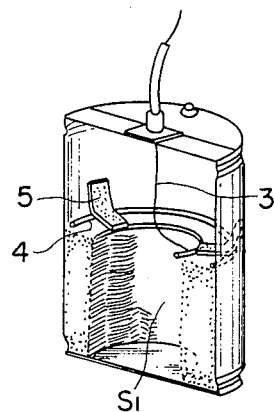

WELDING WIRE CONTAINER

This application is a continuation of application Ser. No. 589,053, filed Mar. 15, 1984, abandoned, which is a continuation of application Ser. No. 334,814, also abandoned.

BACKGROUND OF THE INVENTION (1) Field of the Invention:

The invention relates to a welding wire container, and more particularly to a welding wire packaging container of the type which accommodates a welding wire winding with a multitude of looped wire layers of cylindrical or hollow tubular form and which permits smooth wire withdrawal without disturbing or being entangling with other looped layers of the wire.

(2) Description of Prior Art:

In the field of automatic or semi-automatic welding, there is a trend toward larger packages with a larger stock of welding wire to thereby reduce the time required for wire replacement. Therefore, there is an increasing demand for pail type containers which are easily adapted to larger capacities. When withdrawing welding wire from such a container, it is necessary to ensure that the wire be withdrawn smoothly without disturbing or being entwined with other looped layers of the wire.

The wire which is accommodated in the cylindrical container (hereinafter referred to as pail container) is in the form of a winding having multiple layers of wire loops with inner diameters smaller than that of the container. Due to the rigidity of the wire itself, the looped layers are continuously under the influence of a force which tends to widen the diameter of loops or convolutions. However, as wire is withdrawn from the container, the loosened wire portion tends to spring back and disturb or become entangled with other looped layers or with itself, causing variations in the resistance of wire withdrawal. In such cases, it becomes difficult to withdraw the wire or to feed the wire smoothly. In the conventional pail container wire package, each loop of the coil is imparted with one twist per loop or convolution when packaging the wire in order to prevent torsional deformation of the wire which is being withdrawn axially from the unrotated container. Consequently, the packaged wire tends to spring up with a greater force. Therefore, as shown in FIG. 1, a conventional pail container is constructed with double cylinders, winding a wire 3 in multiple layers between an outer cylinder 1 and an inner cylinder 2 to thereby prevent disintegration of the wire 3, and retaining members 4 are placed on the overlying convolutions of the wire which would otherwise tend to spring up. The inner cylinder 2 is provided with a guide member 6 at the upper end thereof to ensure smooth withdrawal of the wire.

However, such containers involve a large resistance to wire withdrawal since the wire portion which is withdrawn from the container is frictionally contacted with at least the edge portion 4a on the inner surface of the retaining member 4, the outer periphery of the inner cylinder 2 and the guide member 6. In addition, the bending force which acts on the respective contacting portions imparts irregular complicated torsional deformations to the withdrawn wire portion, necessitating a number of rectifying rolls. Further, the containers of this sort entail problems in that the inner cylinder hinders to and complicates the wire winding and packaging operation, and the construction of the container itself, which requires a large number of internal parts, is complicated and costly. Besides, since the inner cylinder has the same height as the outer cylinder, it is necessary to provide the guide hole of a wire withdrawing device at a level at least 200 mm higher than the upper lid surface of the package.

Other welding wire withdrawing methods and packages are disclosed, for example, in Japanese Laid-Open Utility Model Application No. 55-143986, Japanese Laid-Open Patent Application Nos. 55-145971 and 55-145972, and Japanese Laid-Open Utility Model Application Nos. 56-6579 and 56-56783.

SUMMARY OF THE INVENTION

The present invention aims at elimination of the above-mentioned drawbacks and problems, and has as its object the provision of a welding wire packaging container which is simple in its internal construction and low in cost and which also permits smooth withdrawal of the wire.

According to one form of the present invention which attains the above-mentioned object, there is provided a welding wire packaging container which includes a mono-cylinder pail container accommodating a wire winding having multiple layers of wire loops having diameters smaller than the inside diameter of the pail container and forming a cylindrical cavity at the center of the container; a retaining member adapted to be lowered on wire withdrawal while holding the upper surfaces of overlying layers of the wire, the retaining member having a centrally positioned circular wire guide hole for passing the withdrawn wire therethrough; and resilient members provided at least at two spaced positions on the outer peripheral edge of the wire guide hole.

The above and other objects, features and advantages of the present invention will become apparent from the following description and the appended claims, taken in conjunction with the accompanying drawings which illustrate by way of example preferred embodiments of the invention.

BREIF DESCRIPTION OF THE DRAWINGS

In the accompanying drawings:

FIG. 1 is a partly cutaway perspective view showing wire withdrawal from a conventional pail container wire package;

FIG. 2 is a partly cutway perspective view of a first embodiment of the present invention;

DETAILED DESCRIPTION OF PREFERRED EMBODIMENTS

Referring to FIG. 2 illustrating a welding wire packaging container embodying the present invention, the container is in the form of a mono-cylinder pail having an outer cylinder 1 alone or, in other words, with no inner cylinder or with an inner cylinder height which is extremely low, and accommodates therein a welding wire which is wound into a multitude of looped wire layers and placed in the container in intimate contact with the inner peripheral surface thereof. The wire is wound such that the layered convolutions form a center cavity $S_1$ of a relatively large space. A retaining member 4 which is placed on the overlying layers is lowered by gravity as the wire is withdrawn from the container 1 and provided with resilient members 5 at least at two positions on the outer peripheral edge thereof. By arranging the container in this manner, it is made possible to simplify the internal construction of the container and to reduce the resistance of wire withdrawal as well as the torsional deformations of withdrawn wire.

Figure 3:
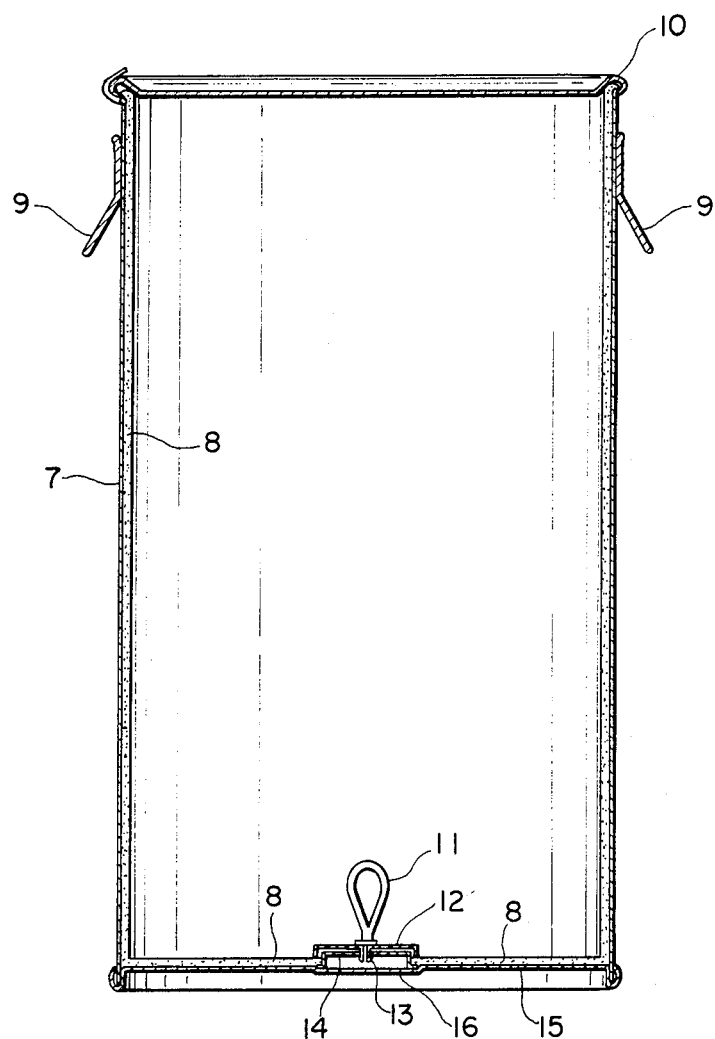
FIG. 3 is a diagrammatic sectional view illustrating a second embodiment of the invention.

Now reference is had to FIG. 3 showing a second embodiment of the present invention. The outer cylinder which is used in the conventional welding wire packaging container is constituted by a paper drum so that there have always been possibilities of the packaged wire damaging the container or dropping out during transportation when its weight is about 100 to 350 kg, in addition to the problem of environmental pollution which is caused by discardment of used containers. In the embodiment of FIG. 3, these problems are solved by employing an outer cylinder 7 of steel with the inner periphery thereof lined with an insulating material 8 like paper. Besides the increased strength, this container structure has an advantage in that it can be treated as a scrap after use. In FIG. 3, indicated by reference number 9 are catches of an upper lid 10. Securely attached to the bottom of the container is a hook tray 12 of a synthetic resin material for mounting a wire stop ring which will be described hereinafter, the hook tray 12 being fixed to a ring mounting seat 14 of steel material by a fitting joint 13 through an insulating material 8. A vinyl foil 15 is interposed between the insulating material 8 and a bottom plate 16.

Figure 4:
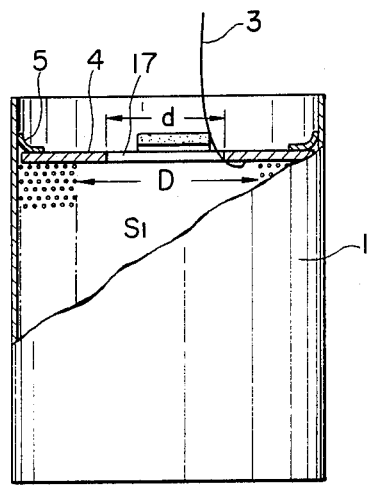
FIG. 4 is a partly cutaway side elevation of a third embodiment of the invention.

In third embodiment shown in FIG. 4, the retaining member 4 which is placed on top of the wire layers is formed so as to have an inside diameter d which is smaller than an average diameter D of the cylindrical or tubular center cavity $S_1$ of the wire layers, and the wire is withdrawn along the inner peripheral edge of the wire guide hole 17 of the retaining member 4, thereby permitting withdrawal of the wire against substantially constant resistance without disturbing other layers or causing snarling.

Figure 5:
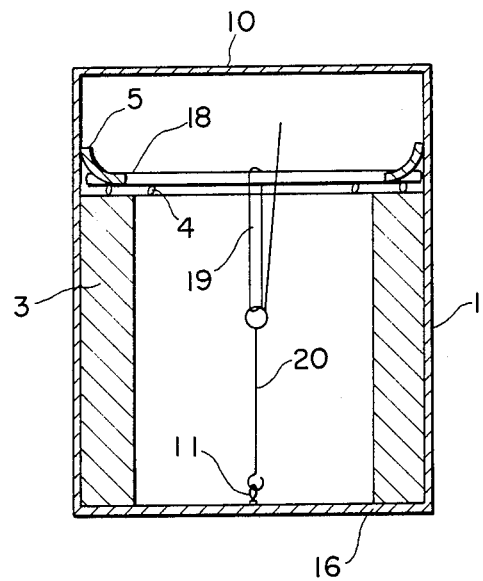
FIG. 5 is a diagrammatic sectional view depicting a fourth embodiment of the container according to the invention.

FIG. 5 shows another a fourth embodiment which is arranged to prevent dislocations of the wire layers and wherein a rigid pressing rod 18 is mounted on the retaining member 4 on top of the wound wire substantially through the center point of and perpendicularly to the axis thereof, with the center portion of the pressing rod 18 connected to the ring 11 substantially at the center of the bottom plate 16 of the container through a resilient member 19 and a hook member 20.

Figure 6A:
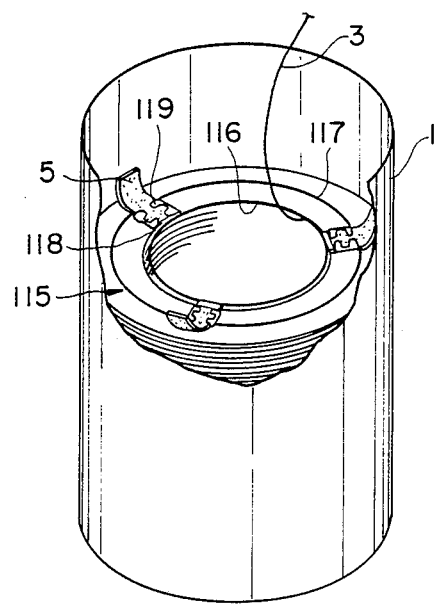
FIG. 6a to 6d are partly cutaway and fragmentary views showing a fifth embodiment of the container according to the invention.
Figure 6B:
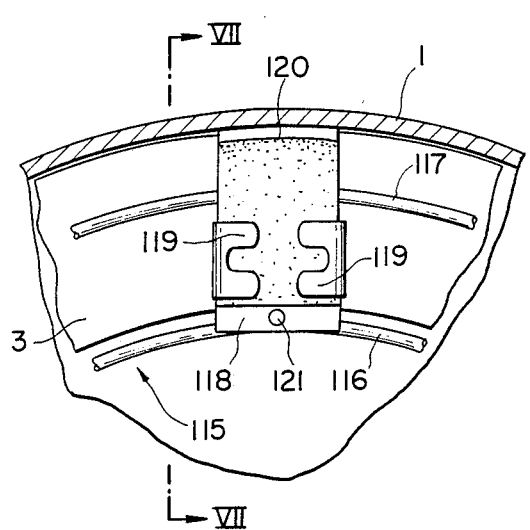
Figure 6C:
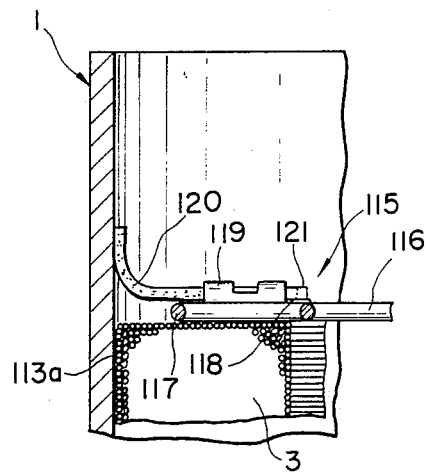
Figure 6D:
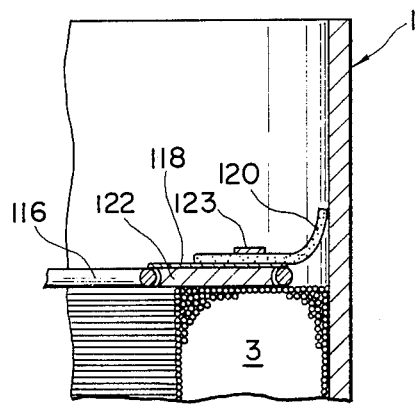

Referring to FIGS. 6a to 6d, there is illustrated a fifth embodiment of the invention in a partly cutaway perspective view, showing a wire which is being withdrawn through a retaining member 115 of a modified form. In this embodiment, the retaining member 115 constitutes by a ring member 116 and a frame member 117 which are disposed in the same plane and securely connected to each other on the upper side thereof by bridge members 118. However, a ring member 116 and a frame member 117 may be connected by a bridge member 118 which is attached to a wire contact piece 122 as shown in FIG. 6d. A flexible resilient member 120 is secured to the bridge member 118 by a hook 123. The wire contact piece 122 may be made of aluminum, iron or vinyl chloride that has rather small friction coefficient. As to the location of the bridge members 118, they may be located in three equidistant positions around the circumference of the retaining member 115 as shown particularly in FIG. 6a, or if desired they may be located at four equidistant positions spaced from each other by 90°. Any way, it suffices to provide the bridge members at least two equidistant positions. The frame member 117 which is shown in an annular form may be of any other form as long as it can be disposed in the same plane with the ring member 116 in face-to-face relation with the overlying layer of the wire 3. For example, it may be of a non-circular shape and may be freely designed in a sinusoidal or bent from if desired. However, it is recommended to form the ring and frame members 116 and 117 in a circular form which is advantageous to the reduction of weight. Further, these members 116 and 117 may be formed of either a metal bar or pipe. Since the member 117 is contacted with the overlying wire portion 3 only in a part thereof, there are less possibilties of the withdrawn wire loop disturbing other loops than in a case where the entire surface of a doughnut type retaining member is contacted with the wire.

On the other hand, each bridge member 118 which interconnects the ring and frame members 116 and 117 as shown in FIGS. 6b (a fragmentary enlarged view of the container of FIG. 6a) and 6c (a section taken on the line VII—VII of FIG. 6b) constitutes a seat for mounting a flexible resilient member 120. Each bridge member 118 includes of a metal strip of a suitable thickness and is welded to the top sides of the ring and frame members 116 and 117. Bridge member 118 is provided with a member for fixing the flexible resilient member 120 which will be described hereinlater. Prefereably, the fixing member is formed integrally with the bridge strip 118. More specifically, gripping tab portions 119 are foldably provided at opposite sides of the bridge strip 118 or they are provided in a folded state by the use of a stamping die. In this connection, the length of projection of the flexible resilient member 120 can be easily adjusted by providing a stopper 121 in a central position across the width of the bridge member 118. Although the stopper 121 is shown as an embossment, it may be formed by folding or lancing part of the bridge member 118 or may be provided on part of the gripping tabs 119.

Flexible resilient member 120 mounted on the bridge member 118 is abutted against the inner wall surface of the container 1 in a flexed state as shown particularly in FIG. 6c with such friction of abutment which permits gravitation of the retaining member 115 while preventing the wire from overriding through the gap 113a. In general, a strip of rubber or synthetic rubber of suitable hardness is used as the flexible resilient member 120.

With the above-described welding wire packaging container construction according to the present invention, the top surfaces of the overlying wire layers are pressed and held by the bottom surfaces of the retaining member, so that there is less possibility of the unwound loop disturbing other loops. In addition, each flexible resilient member on the bridge member which interconnects the ring and frame members is mounted in such a manner as to permit adjustment of its bending position, allowing uniform the contact pressure between the inner wall surface of the container and the respective flexible spring members. The retaining member is easy to handle and manufacture and capable to serve as an excellent retainer, ensuring smooth wire withdrawal for rational welding operations.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A wire packaging container comprising:
   (a) a bottom portion in the form of a mono-cylinder pail having substantially no inner cylinder and having a bottom;
   (b) a multitude of layers of looped wire portions disposed in said bottom portion, said layers having outer diameters smaller than the inside diameter of said bottom portion and inside diameters which define a central cavity of substantially cylindrical form;
   (c) a vertically movable retaining member loosely disposed within said bottom portion on top of said layers, said retaining member being in the form of a flat ring the bottom surface of which bears against said layers, the outer surface of which is adjacent the inner surface of said bottom portion, and the inner surface of which has an inside diameter which is smaller than the inside diameter of said layers, whereby the wire may be withdrawn along the inner peripheral edge of said retaining member, thereby ensuring withdrawal of the wire against substantially constant resistance without disturbing lower layers of the wire or causing snarling; and
   (d) a plurality of resilient members mounted on said retaining members, said resilient members containing the inner surface of said bottom portion but permitting said retaining member to move downwardly in said bottom portion under the force of gravity as the wire is withdrawn.

2. A wire packaging container comprising:
   (a) a bottom portion in the form of a cylinder having a bottom;
   (b) a multitude of layers of looped wire portions disposed in said bottom portion, said layers having outer diameters smaller than the inside diameter of said bottom portion and inside diameters which define a central cavity of substantially cylindrical form;
   (c) an upper lid disposed on said bottom portion;
   (d) a retaining member disposed within said bottom portion on top of said layers and beneath said upper lid, said retaining member being vertically freely downwardly movable relative to said bottom portion and having a centrally disposed first guide hole to permit wire withdrawal therethrough;
   (e) spring means biasing said retaining member vertically downwardly, whereby said retaining member is maintained in downwardly biased contact with the upper surface of said layers as wire is withdrawn from said container; and
   (f) a plurality of resilient members mounted on said retaining member at spaced positions around the outer periphery thereof, said resilient members resiliently contacting the inner periphery of said bottom portion.

3. A wire packaging container as recited in claim 2 wherein said means act along the central axis of the substantially cylindrical central cavity of said layers of looped wire.

4. A wire packaging container as recited in claim 2 wherein said upper lid contains a second guide hole to permit wire withdrawal therethrough, said second guide hole being vertically spaced above said first guide hole.

5. A wire packaging container as recited in claim 2 wherein said bottom portion is formed of a metallic outer layer and an electrically insulating inner layer which electrically insulates the metallic outer layer from wire contained in said bottom portion.

6. A wire packaging container comprising:
   (a) a bottom portion in the form of a cylinder having a bottom;
   (b) a multitude of layers of looped wire portions disposed in said bottom portion, said layers having outer diameters smaller than the inside diameter of said bottom portion and inside diameters which define a central cavity of substantially cylindrical form;
   (c) an upper lid disposed on said bottom portion;
   (d) a retaining member disposed within said bottom portion on top of said layers and beneath said upper lid, said retaining member:
      (i) being vertically freely downwardly movable relative to said bottom portion and having a centrally disposed first guide hole to permit wire withdrawal therethrough; and
      (ii) comprising an inner ring member and an outer frame member radially spaced from one another, said inner ring member and said outer frame member being disposed in the same horizontal plane and being securely connected to one another on the upper side thereof by a plurality of bridge members at spaced positions around said inner ring member and said outer frame member; and
   (f) a resilient member mounted on each of said bridge members, said resilient members:
      (i) resiliently contacting the inner periphery of said bottom portion and
      (ii) being radially outwardly movable in their entireties relative to said bridge members, whereby the resilient force with which they bear against the inner periphery of said bottom portion can be adjusted.

7. A wire packaging container as recited in claim 6 and further comprising spring means biasing said retaining member vertically downwardly, whereby said retaining member is maintained in downwardly biased contact with the upper surface of said layer as wire is withdrawn from said container.

8. A wire packaging container as recited in claim 6 wherein said bottom portion is formed on a metallic outer layer and an electrically insulating inner layer which electrically insulates the metallic outer layer from wire contained in said bottom portion.

9. A wire packaging container as recited in claim 6 wherein said inner ring member and said outer frame member are both circular in cross-section.

10. A wire packaging container as recited in claim 6 wherein said upper lid contains a second guide hole to permit wire withdrawal therethrough, said second guide hole being vertically spaced above said first guide hole.

* * * * *

UNITED STATES PATENT AND TRADEMARK OFFICE
CERTIFICATE OF CORRECTION

PATENT NO. : 4,869,367
DATED : Sep. 26, 1989
INVENTOR(S) : Eiichiro Kawasaki, et al It is certified that error appears in the above-identified patent and that said Letters Patent is hereby corrected as shown below:

On the title page:

The 4th Foreign Application Priority Data is incorrectly recorded, "Apr. 13, 1981.....Japan.....59-53550[U]" should be:

--Apr. 13, 1981.....Japan.....56-53550[U]--

Signed and Sealed this

Tenth Day of April, 1990

*Attest:*

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,869,367
DATED : SEPTEMBER 26, 1989
INVENTOR(S) : EIICHIRO KAWASAKI ET AL

It is certified that error appears in the above-identified patent and that said Letters Patent is hereby corrected as shown below:

Cover page, item [30], delete "April 22, 1980 [JP] Japan.... 55-53976";

In column 1, line 11, change "The" to --This--;

In column 2, line 50, change "cutway" to --cutaway--;

In column 3, line 49, delete "another" after "Fig. 5 shows";

In column 5, lines 36-37 (claim 1, lines 25-26), change "containing" to --contacting--.

Signed and Sealed this

Twenty-sixth Day of May, 1992

Attest:

DOUGLAS B. COMER

*Attesting Officer*       Acting Commissioner of Patents and Trademarks